(12) United States Patent
Furukawa et al.

(10) Patent No.: US 11,965,048 B2
(45) Date of Patent: Apr. 23, 2024

(54) ACRYLIC RESIN, PRODUCING METHOD THEREOF, RESIN COMPOSITION SET, HEAT STORAGE MATERIAL, AND ARTICLE

(71) Applicant: Showa Denko Materials Co., Ltd., Tokyo (JP)

(72) Inventors: Naoki Furukawa, Tokyo (JP); Nozomi Matsubara, Tokyo (JP); Tsuyoshi Morimoto, Tokyo (JP); Akira Nagai, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 463 days.

(21) Appl. No.: 17/261,877

(22) PCT Filed: Jun. 27, 2019

(86) PCT No.: PCT/JP2019/025728
§ 371 (c)(1),
(2) Date: Jan. 21, 2021

(87) PCT Pub. No.: WO2020/021958
PCT Pub. Date: Jan. 30, 2020

(65) Prior Publication Data
US 2021/0301059 A1   Sep. 30, 2021

(30) Foreign Application Priority Data

Jul. 25, 2018 (JP) ................. 2018-139571

(51) Int. Cl.
| C08F 220/18 | (2006.01) |
| C08F 220/20 | (2006.01) |
| C08F 220/36 | (2006.01) |
| C08F 290/12 | (2006.01) |
| C08K 5/14 | (2006.01) |
| C09K 5/06 | (2006.01) |

(52) U.S. Cl.
CPC .... *C08F 290/126* (2013.01); *C08F 220/1804* (2020.02); *C08F 220/1812* (2020.02); *C08F 220/1818* (2020.02); *C08F 220/20* (2013.01); *C08F 220/36* (2013.01); *C08K 5/14* (2013.01); *C09K 5/063* (2013.01)

(58) Field of Classification Search
CPC .............. C09K 5/063; C08F 220/1812; C08F 220/1818
See application file for complete search history.

(56) References Cited

FOREIGN PATENT DOCUMENTS

| CN | 1643104 | 7/2005 |
| CN | 103477270 | 12/2013 |
| EP | 492509 A1 * | 7/1992 | ............ C08F 220/18 |
| JP | H04252214 | 9/1992 |
| JP | 2000109787 | 4/2000 |
| JP | 2004137301 | 5/2004 |
| JP | 2005023229 | 1/2005 |
| JP | 2009046638 | 3/2009 |
| JP | 2010024283 | 2/2010 |
| JP | 2011032365 | 2/2011 |
| JP | 2012219180 | 11/2012 |
| JP | 2014095023 | 5/2014 |
| JP | 2016161657 A * | 9/2016 |
| JP | 2017122174 | 7/2017 |
| WO | 2011013738 | 2/2011 |

OTHER PUBLICATIONS

A machine translation into English of JP 2016-161657A; Suzuki (Year: 2016).*

* cited by examiner

*Primary Examiner* — Karuna P Reddy
(74) *Attorney, Agent, or Firm* — JCIPRNET

(57) ABSTRACT

An aspect according to the present invention provides an acrylic resin including a first structural unit represented by formula (1) and a second structural unit represented by formula (2):

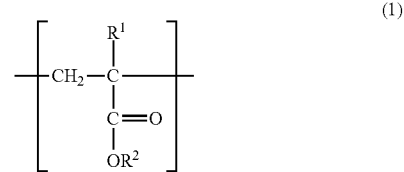

[in the formula (1), $R^1$ represents a hydrogen atom or a methyl group, and $R^2$ represents an alkyl group having 12-30 carbon atoms]

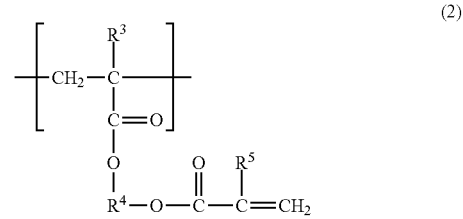

[in the formula (2), $R^3$ and $R^5$ each independently represent a hydrogen atom or a methyl group, and $R^4$ represents a divalent organic group].

5 Claims, 1 Drawing Sheet

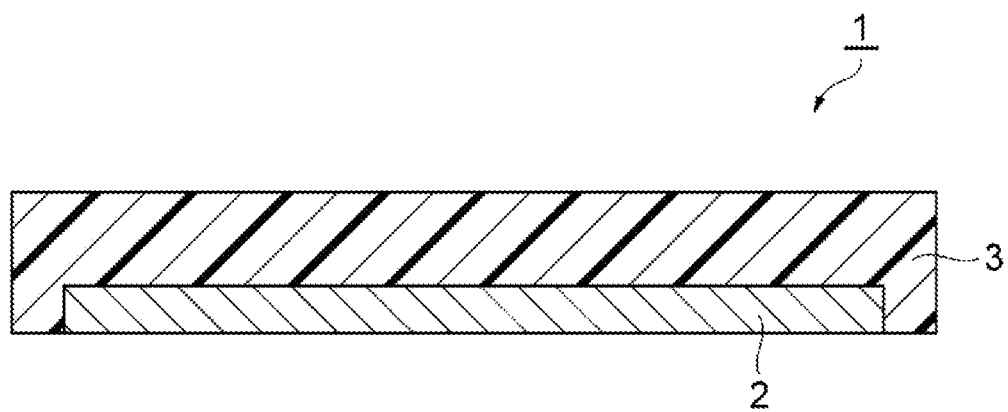

ACRYLIC RESIN, PRODUCING METHOD THEREOF, RESIN COMPOSITION SET, HEAT STORAGE MATERIAL, AND ARTICLE

CROSS-REFERENCE TO RELATED APPLICATION

This application is a 371 of international application of PCT application serial no. PCT/JP2019/025728, filed on Jun. 27, 2019, which claims the priority benefit of Japan application no. 2018-139571, filed on Jul. 25, 2018. The entirety of each of the above-mentioned patent applications is hereby incorporated by reference herein and made a part of this specification.

TECHNICAL FIELD

The present invention relates to an acrylic resin, a method of producing the same, a resin composition set, a heat storage material, and an article.

BACKGROUND ART

Heat storage materials are materials that can take out stored energy as heat as necessary. These heat storage materials are used for applications such as air conditioning instruments, floor heating devices, refrigerators, electronic components such as an IC chip, interior and exterior materials for automobiles, automobile parts such as canisters, insulating containers, and the like.

Regarding a heat storage method, latent heat storage utilizing a phase change of a substance is widely used in consideration of amount of heat. Water-ice is a well-known latent heat storage substance. Water-ice is a substance having a large amount of heat, but its application range is limited because the phase change temperature is limited to 0° C. in the atmosphere. Therefore, paraffin is used as a latent heat storage substance having a phase change temperature of higher than 0° C. and 100° C. or lower. However, paraffin becomes a liquid when it undergoes a phase change due to heating, and there is a risk of ignition and combustion. Therefore, in order to use paraffin as a heat storage material, it is necessary to prevent paraffin from leaking from the heat storage material by storing it in a sealed container such as a bag and its fields of application are limited.

Regarding a method of improving a heat storage material containing paraffin, for example, Patent Literature 1 discloses a method using a gelling agent. The gel produced by this method can maintain a gel-like molded product even after the phase of paraffin changes. However, in this method, liquid leakage, volatilization of the heat storage material, and the like may occur when used as a heat storage material.

In addition, as another improvement method, for example, Patent Literature 2 discloses a method using a hydrogenated conjugated diene copolymer. In this method, the form can be maintained near a melting or solidification temperature of a hydrocarbon compound, but when the temperature becomes higher, phase separation occurs due to low compatibility, and liquid leakage of the hydrocarbon compound occurs.

In addition, as still another improvement method, for example, Patent Literature 3 discloses a method of microencapsulating a heat storage material. In this method, since the heat storage material is encapsulated, handling properties are favorable regardless of the phase change, but there is a concern of the heat storage material leaking from the capsule in a high temperature range.

CITATION LIST

Patent Literature

Patent Literature 1
Japanese Patent Laid-Open No. 2000-109787
Patent Literature 2
Japanese Patent Laid-Open No. 2014-95023
Patent Literature 3
Japanese Patent Laid-Open No. 2005-23229

SUMMARY

Technical Problem

An objective of one aspect of the present invention is to provide an acrylic resin suitably used as a heat storage material and a resin composition set using the acrylic resin. An objective of another aspect of the present invention is to provide a heat storage material having an excellent amount of heat storage.

Solution to Problem

The inventors conducted extensive studies, and as a result, found that an acrylic resin including specific structural units is suitably used as a heat storage material, and a two-component resin composition set suitably used as a heat storage material is obtained from the acrylic resin. That is, the inventors found that the heat storage material obtained from the resin composition set containing an acrylic resin including specific structural units has an excellent amount of heat storage and completed the present invention. Some aspects of the present invention provide the following [1] to [11].

[1] An acrylic resin containing a first structural unit represented by the following Formula (1) and a second structural unit represented by the following Formula (2):

[Chem. 1]

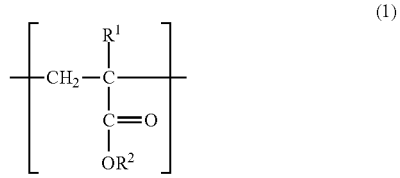

[in the formula, $R^1$ represents a hydrogen atom or a methyl group and $R^2$ represents an alkyl group having 12 to 30 carbon atoms]

[Chem. 2]

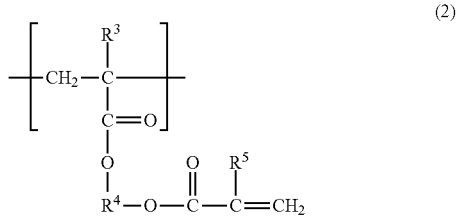

[in the formula, $R^3$ and $R^5$ each independently represent a hydrogen atom or a methyl group, and $R^4$ represents a divalent organic group].

[2] The acrylic resin according to [1], wherein a content of the first structural unit is 60 parts by mass or more with respect to 100 parts by mass of all structural units constituting the acrylic resin.

[3] The acrylic resin according to [1] or [2], wherein a content of the second structural unit is 25 parts by mass or less with respect to 100 parts by mass of all structural units constituting the acrylic resin.

[4] A production method of an acrylic resin, including: polymerizing a monomer component containing a first monomer represented by the following Formula (3) and a second monomer copolymerizable with the first monomer and having a reactive group A to obtain an acrylic resin intermediate having the reactive group A; and reacting the acrylic resin intermediate with a monomer component containing a third monomer having a reactive group B capable of reacting with the reactive group A of the acrylic resin intermediate:

[Chem. 3]

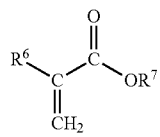

(3)

[in the formula, $R^6$ represents a hydrogen atom or a methyl group, and $R^7$ represents an alkyl group having 12 to 30 carbon atoms].

[5] The production method according to [4], wherein the reactive group A is a hydroxyl group.

[6] The production method according to [4] or [5], wherein the reactive group B is an isocyanate group.

[7] A resin composition set, including a first liquid containing an oxidizing agent and a second liquid containing a reducing agent, wherein at least one of the first liquid and the second liquid contains the acrylic resin according to any one of [1] to [3].

[8] The resin composition set according to [7], wherein at least one of the first liquid and the second liquid further contains a monomer represented by the following Formula (4):

[Chem. 4]

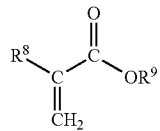

(4)

[in the formula, $R^8$ represents a hydrogen atom or a methyl group, and $R^9$ represents an alkyl group having 12 to 30 carbon atoms].

[9] The resin composition set according to [7] or [8], wherein the resin composition set is used to form a heat storage material.

[10] A heat storage material containing a cured product of a mixture of the first liquid and the second liquid in the resin composition set according to any one of [7] to [9].

[11] An article, including: a heat source; and the heat storage material according to provided to be in thermal contact with the heat source.

Advantageous Effects of Invention

According to one aspect of the present invention, it is possible to provide an acrylic resin suitably used as a heat storage material and a resin composition set using the acrylic resin. In addition, a resin composition set according to one aspect of the present invention has excellent reactivity when two liquids are mixed, and a cured product of the resin composition can be obtained in a short time of within 1 hour, more preferably within 30 minutes, and still more preferably within 10 minutes. In addition, according to another aspect of the present invention, it is possible to provide a heat storage material having an excellent amount of heat storage.

BRIEF DESCRIPTION OF DRAWINGS

FIG. 1 is a schematic cross-sectional view showing one embodiment of an article including a heat storage material.

DESCRIPTION OF EMBODIMENTS

Embodiments of the present invention will be appropriately described below with reference to the drawings. Here, the present invention is not limited to the following embodiments.

In this specification, "(meth)acrylate" means "acrylate" and a corresponding "methacrylate" and "(meth)acryloyl" means "acryloyl" and a corresponding "methacroyl."

The weight average molecular weight (Mw) and number average molecular weight (Mn) in this specification were measured by gel permeation chromatography (GPC) under the following conditions and mean values determined using polystyrene as a standard substance.

Measuring instrument: HLC-8320GPC (product name, commercially available from Tosoh Corporation)
Analytical column: TSK gel SuperMultipore HZ-H (3 columns connected) (product name, commercially available from Tosoh Corporation)
Guard column: TSK guardcolumn SuperMP(HZ)-H (product name, commercially available from Tosoh Corporation)
Eluent: THF
Measurement temperature: 25° C.

An acrylic resin according to one embodiment includes the following first structural unit and second structural unit.

The first structural unit is represented by the following Formula (1).

[Chem. 5]

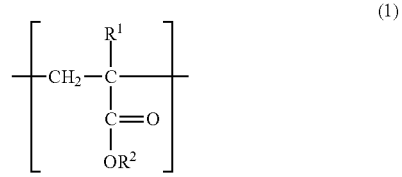

(1)

In the formula, $R^1$ represents a hydrogen atom or a methyl group, and $R^2$ represents an alkyl group having 12 to 30 carbon atoms.

The alkyl group represented by $R^2$ may be linear or branched. The number of carbon atoms of the alkyl group represented by $R^2$ is preferably 12 to 28, more preferably 12 to 24, still more preferably 12 to 22, and particularly preferably 12 to 18. Examples of alkyl groups represented by $R^2$ include a dodecyl group (lauryl group), a tetradecyl group, a hexadecyl group (cetyl group), an octadecyl group (stearyl group), a docosyl group (behenyl group), a tetracosyl group, a hexacosyl group, and an octacosyl group. The alkyl group represented by $R^2$ is preferably at least one selected from the group consisting of a dodecyl group (lauryl group), a tetradecyl group, a hexadecyl group (cetyl group), and an octadecyl group (stearyl group). The acrylic resin includes one or more of these first structural units.

In other words, the first structural unit is a structural unit derived from an alkyl (meth)acrylate having a linear or branched alkyl group having 12 to 30 carbon atoms at the end of the ester group.

In order to obtain a sufficient amount of heat storage when the heat storage material is formed, the content of the first structural unit is preferably 60 parts by mass or more, more preferably 70 parts by mass or more, and still more preferably 80 parts by mass or more, and may be, for example, 98 parts by mass or less, with respect to 100 parts by mass of all structural units constituting the acrylic resin.

The second structural unit is represented by the following Formula (2).

[Chem. 6]

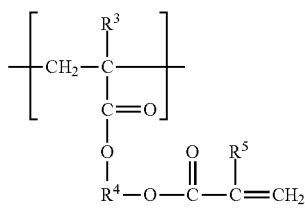

(2)

In the formula, $R^3$ and $R^5$ each independently represent a hydrogen atom or a methyl group, and $R^4$ represents a divalent organic group.

The divalent organic group represented by $R^4$ is not particularly limited, and may be a group incidentally generated when the (meth)acryloyl group of the second structural unit is introduced. The divalent organic group may be any of various groups depending on the type of the reactive group A of the second monomer to be described below and the reactive group B of the third monomer to be described below. For example, the divalent organic group may be a group represented by any of the following Formulae (5) to (8).

[Chem. 7]

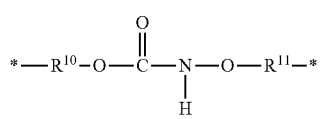

(5)

In the formula, $R^{10}$ and $R^{11}$ each independently represent a divalent hydrocarbon group, and * represents a bond (hereinafter the same).

[Chem. 8]

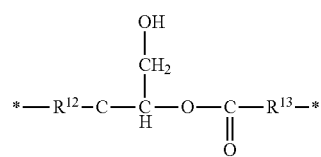

(6)

In the formula, $R^{12}$ and $R^{13}$ each independently represent a divalent hydrocarbon group.

[Chem. 9]

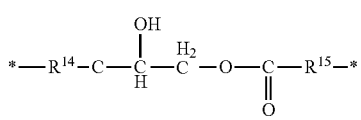

(7)

In the formula, $R^{14}$ and $R^{15}$ each independently represent a divalent hydrocarbon group.

[Chem. 10]

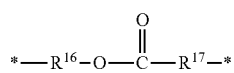

(8)

In the formula, $R^{16}$ and $R^{17}$ each independently represent a divalent hydrocarbon group.

The divalent hydrocarbon group represented by $R^{10}$ to $R^{17}$ may be an alkylene group or a cycloalkylene group. When the divalent hydrocarbon group is an alkylene group, the alkylene group may be linear or branched. The number of carbon atoms of the divalent hydrocarbon group represented by $R^{10}$ to $R^{17}$ may be, for example, 1 to 10, 1 to 8, 1 to 6, 1 to 4 or 1 to 2.

In other words, the second structural unit is a structural unit having a (meth)acryloyl group. The (meth)acryloyl groups in the second structural unit can react with each other via free radicals, and thus the acrylic resin is cured.

In order to obtain a sufficient amount of heat storage when the heat storage material is formed, the content of the second structural unit is preferably 25 parts by mass or less, more preferably 20 parts by mass or less, still more preferably 16 parts by mass or less, and particularly preferably 13 parts by mass or less, and may be, for example, 2 parts by mass or more, with respect to 100 parts by mass of all structural units constituting the acrylic resin.

The acrylic resin may further include other structural units as necessary in addition to the first structural unit and the second structural unit. Examples of other structural units include structural units derived from an alkyl (meth)acrylate having an alkyl group having less than 12 carbon atoms (1 to 11 carbon atoms) at the end of the ester group such as methyl (meth)acrylate, ethyl (meth)acrylate, propyl (meth)acrylate, and butyl (meth)acrylate; and structural units derived from a cycloalkyl (meth)acrylate having a cyclic hydrocarbon group at the end of the ester group such as isobornyl (meth)acrylate and dicyclopentanyl (meth)acrylate.

In one embodiment, the acrylic resin includes only the first structural unit and the second structural unit, and as necessary, a structural unit (structural unit a) derived from at least one monomer selected from the group consisting of an alkyl (meth)acrylate having an alkyl group having 1 to 11 carbon atoms at the end of the ester group and a cycloalkyl (meth)acrylate having a cyclic hydrocarbon group at the end of the ester group. In other words, in one embodiment, the acrylic resin does not include any structural unit other than the first structural unit, the second structural unit and the structural unit a (for example, a structural unit derived from a (meth)acrylic monomer having a siloxane framework). In one embodiment, the acrylic resin may include only the first structural unit and the second structural unit, and in another embodiment, the acrylic resin may include only the first structural unit, the second structural unit, and the structural unit a.

The acrylic resin may be any of a random copolymer, a block copolymer and a graft copolymer.

In one embodiment, the acrylic resin becomes a liquid at room temperature (25° C.), and in order to reduce the viscosity of the first liquid and/or the second liquid when used in the resin composition set to be described below and facilitate mixing, the weight average molecular weight of the acrylic resin is preferably 100,000 or less, more preferably 70,000 or less, and still more preferably 40,000 or less. In this case, the weight average molecular weight of the acrylic resin may be, for example, 5,000 or more.

In another embodiment, in order to obtain an excellent strength for the heat storage material, the weight average molecular weight of the acrylic resin may be 200,000 or more, 250,000 or more, or 300,000 or more. In consideration of ease of handling of the acrylic resin, the weight average molecular weight of the acrylic resin may be 2,000,000 or less, 1,500,000 or less, or 1,000,000 or less. When an acrylic resin having a weight average molecular weight of 200,000 or more is used in the first liquid and/or the second liquid of the resin composition set to be described below, preferably, the monomer X to be described below is used in combination. Therefore, the form of the first liquid and/or the second liquid at room temperature (25° C.) can be a liquid.

In one embodiment, a method of producing the acrylic resin includes a step in which a monomer component containing a first monomer and a second monomer which is copolymerizable with the first monomer and has a reactive group A (hereinafter referred to as a "monomer component A") is polymerized to obtain an acrylic resin intermediate having the reactive group A, and a step in which an acrylic resin intermediate is caused to react with a monomer component containing a third monomer having a reactive group B that can react with the reactive group A of the acrylic resin intermediate (hereinafter referred to as a "monomer component B").

In a step of obtaining an acrylic resin intermediate, the first monomer is preferably represented by the following Formula (3).

[Chem. 11]

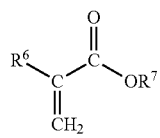

(3)

In the formula, $R^6$ represents a hydrogen atom or a methyl group, and $R^7$ represents an alkyl group having 12 to 30 carbon atoms.

The alkyl group represented by $R^7$ may be linear or branched. The number of carbon atoms of the alkyl group represented by $R^7$ is preferably 12 to 28, more preferably 12 to 24, still more preferably 12 to 22, and particularly preferably 12 to 18.

In other words, the first monomer is an alkyl (meth) acrylate having a linear or branched alkyl group having 12 to 30 carbon atoms at the end of the ester group. Examples of first monomers include dodecyl (meth)acrylate (lauryl (meth)acrylate), tetradecyl (meth)acrylate, hexadecyl (meth)acrylate (cetyl (meth)acrylate), octadecyl (meth)acrylate (stearyl (meth)acrylate), docosyl (meth)acrylate (behenyl (meth)acrylate), tetracosyl (meth)acrylate, hexacosyl (meth)acrylate, and octacosyl (meth)acrylate. These first monomers may be used alone or two or more thereof may be used in combination. The first monomer is preferably at least one selected from the group consisting of dodecyl (meth)acrylate (lauryl (meth)acrylate), tetradecyl (meth)acrylate, hexadecyl (meth)acrylate (cetyl (meth)acrylate), and octadecyl (meth) acrylate (stearyl (meth)acrylate).

In order to obtain a sufficient amount of heat storage when the heat storage material is formed, the content of the first monomer is preferably 60 parts by mass or more, more preferably 70 parts by mass or more, and still more preferably 80 parts by mass or more, and may be, for example, 98 parts by mass or less with respect to 100 parts by mass of a total amount of the monomer components (a total content of the monomer component A and the monomer component B; hereinafter the same).

The second monomer is a monomer (reactivity monomer) which is copolymerizable with the first monomer and has a reactive group A. The second monomer has a (meth)acryloyl group so that it is copolymerizable with the first monomer. That is, the second monomer is preferably a monomer having a reactive group A and a (meth)acryloyl group ((meth)acrylic monomer having a reactive group A).

The reactive group A in the second monomer is a group that can react with the third monomer to be described below, and is, for example, at least one group selected from the group consisting of a hydroxyl group, an amino group, and an epoxy group. That is, the second monomer is, for example, a hydroxyl group-containing (meth)acrylic monomer, an amino group-containing (meth)acrylic monomer, or an epoxy group-containing (meth)acrylic monomer.

Examples of hydroxyl group-containing (meth)acrylic monomers include hydroxyalkyl (meth)acrylates such as 2-hydroxyethyl (meth)acrylate, 3-hydroxypropyl (meth) acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate; and hydroxyalkylcycloalkane (meth)acrylates such as (4-hydroxymethylcyclohexyl)methyl (meth)acrylate.

Examples of amino group-containing (meth)acrylic monomers include N,N-dimethylaminoethyl (meth)acrylate, N,N-diethylaminoethyl (meth)acrylate, N,N-dimethylaminopropyl (meth)acrylate, and N,N-diethylaminopropyl (meth)acrylate.

Examples of epoxy group-containing (meth)acrylic monomers include glycidyl (meth)acrylate, α-ethylglycidyl (meth)acrylate, α-n-propylglycidyl (meth)acrylate, α-n-butyl glycidyl (meth)acrylate, 3,4-epoxybutyl (meth)acrylate, 4,5-epoxypentyl (meth)acrylate, 6,7-epoxyheptyl (meth)acrylate, 6,7-epoxyheptyl α-ethyl (meth)acrylate, 3,4-epoxybutyl 3-methyl (meth)acrylate, 4,5-epoxypentyl 4-methyl (meth)acrylate, 5,6-epoxyhexyl 5-methyl (meth)acrylate, β-methylglycidyl (meth)acrylate, and 3-methylglycidyl α-ethyl (meth)acrylate.

In order to obtain a sufficient amount of heat storage when the heat storage material is formed, the content of the second monomer is preferably 25 parts by mass or less, more preferably 20 parts by mass or less, still more preferably 16 parts by mass or less, and particularly preferably 13 parts by mass or less, and may be, for example, 2 parts by mass or more, with respect to 100 parts by mass of a total amount of the monomer components.

An acrylic resin intermediate is obtained by polymerizing the monomer component A including the first monomer and the second monomer. The acrylic resin intermediate includes a structural unit derived from the first monomer and a structural unit derived from the second monomer. The acrylic resin intermediate has a reactive group A derived from the second monomer.

The monomer component A may further include other monomers, as necessary, in addition to the first monomer and the second monomer. Examples of other monomers include alkyl (meth)acrylates having an alkyl group having less than 12 carbon atoms (1 to 11 carbon atoms) at the end of the ester group such as methyl (meth)acrylate, ethyl (meth)acrylate, propyl (meth)acrylate, and butyl (meth)acrylate; and a cycloalkyl (meth)acrylate having a cyclic hydrocarbon group at the end of the ester group such as isobornyl (meth)acrylate and dicyclopentanyl (meth)acrylate. Other monomers may be used alone or two or more thereof may be used in combination. When the monomer component A includes other monomers, the acrylic resin intermediate includes a structural unit derived from other monomers in addition to the structural unit derived from the first monomer and the structural unit derived from the second monomer.

The method of polymerizing the monomer component A can be appropriately selected from among known polymerization methods such as various radical polymerizations, and examples thereof include a suspension polymerization method, a solution polymerization method, and a bulk polymerization method. Regarding the polymerization method, when the weight average molecular weight of the acrylic resin is large (for example, 200,000 or more), a suspension polymerization method is preferably used, and when the weight average molecular weight of the acrylic resin is small (for example, 100,000 or less), a solution polymerization method is preferably used.

When the suspension polymerization method is used, monomer components that are raw materials, a polymerization initiator, a chain transfer agent that is added as necessary, water and a suspension aid are mixed to prepare a dispersion solution.

Examples of suspension aids include water-soluble polymers such as polyvinyl alcohol, methyl cellulose, and polyacrylamide, and sparingly soluble inorganic substances such as calcium phosphate and magnesium pyrophosphate. Among these, a water-soluble polymer such as polyvinyl alcohol is preferably used.

The amount of the suspension aid added is preferably 0.005 to 1 part by mass, more preferably 0.01 to 0.07 parts by mass, and still more preferably 0.01 to 0.03 parts by mass with respect to 100 parts by mass of a total amount of the monomer components that are raw materials. When the suspension polymerization method is used, a molecular weight adjusting agent such as a mercaptan compound, thioglycol, carbon tetrachloride, and an α-methylstyrene dimer may be additionally added as necessary. The polymerization temperature is preferably 0 to 200° C., more preferably 40 to 120° C., and still more preferably 60 to 100° C.

When the solution polymerization method is used, examples of solvents to be used include aromatic solvents such as toluene and xylene, ketone solvents such as methyl ethyl ketone and methyl isobutyl ketone, ester solvents such as ethyl acetate and butyl acetate, chlorine solvents such as carbon tetrachloride, and alcoholic solvents such as 2-propanol and 2-butanol. In consideration of the polymerizability of the obtained acrylic resin, the solid content concentration in the solution when solution polymerization starts is preferably 30 to 80 mass %, more preferably 40 to 70 mass %, and still more preferably 50 to 60 mass %. The polymerization temperature is preferably 0 to 200° C., more preferably 40 to 120° C., and still more preferably 60 to 100° C.

The polymerization initiator used in each polymerization method can be used without particular limitation as long as it is a radical polymerization initiator. Examples of radical polymerization initiators include organic peroxides such as benzoyl peroxide, lauroyl peroxide, di-t-butylperoxyhexahydroterephthalate, t-butylperoxy-2-ethylhexanoate, 1,1-t-butylperoxy-3,3,5-trimethylcyclohexane, and t-butyl peroxyisopropyl carbonate, and azo compounds such as azobisisobutyronitrile, azobis-4-methoxy-2,4-dimethylvaleronitrile, azobiscyclohexanone-1-carbonitrile, and azodibenzoyl.

In order to sufficiently polymerize monomers, the amount of the polymerization initiator added is preferably 0.01 parts by mass or more, more preferably 0.05 parts by mass or more, and still more preferably 0.1 parts by mass or more with respect to 100 parts by mass of a total amount of the monomer components. In order to set the molecular weight of the acrylic resin to be in a suitable range, reduce the amount of a decomposition product, and obtain suitable adhesive strength when used as a heat storage material, the amount of the polymerization initiator added is preferably 10 parts by mass or less, more preferably 5 parts by mass or less, and still more preferably 3 parts by mass or less with respect to 100 parts by mass of a total amount of the monomer components.

A step of reacting an acrylic resin intermediate with the monomer component B may be a step of reacting an acrylic resin intermediate with the third monomer according to an addition reaction. For example, the addition reaction may be performed by heating a mixture containing the acrylic resin intermediate and the monomer component B. The reaction temperature in the case may be 50° C. or higher or 120° C. or lower.

The third monomer contained in the monomer component B is a monomer that can react with the acrylic resin intermediate, and is a monomer having a reactive group B that can react with the reactive group A in the acrylic resin intermediate. The third monomer is a monomer having a reactive group B and a (meth)acryloyl group ((meth)acrylic monomer having a reactive group B). The (meth)acryloyl group in the above second structural unit is derived from the (meth)acryloyl group in the third monomer.

The reactive group B in the third monomer is a group that can react with the acrylic resin intermediate, and more specifically, a group that can react with the reactive group A in the acrylic resin intermediate. The reactive group B in the third monomer is, for example, at least one group selected from the group consisting of an isocyanate group and a carboxylic group. That is, the third monomer is, for example, an isocyanate group-containing (meth)acrylic monomer or a carboxylic group-containing (meth)acrylic monomer.

Examples of isocyanate group-containing (meth)acrylic monomers include 2-isocyanatoethyl methacrylate and 2-acryloyloxyethyl isocyanate.

Examples of carboxylic group-containing (meth)acrylic monomers include (meth)acrylic acid, carboxyethyl (meth) acrylate, and carboxypentyl (meth)acrylate.

In order to obtain a sufficient amount of heat storage when the heat storage material is formed, the content of the third monomer is preferably 20 parts by mass or less, more preferably 15 parts by mass or less, still more preferably 10 parts by mass or less, and particularly preferably 5 parts by mass or less, and may be, for example, 0.1 parts by mass or more, with respect to 100 parts by mass of a total amount of the monomer components.

In the step of reacting the acrylic resin intermediate with the monomer component B, a catalyst may be added in order to promote a reaction of adding the third monomer to the acrylic resin intermediate. The catalyst may be an organophosphorus catalyst such as triphenylphosphine, a tertiary amine catalyst, a quaternary ammonium salt catalyst, or a tin catalyst such as dibutyltin dilaurate.

The above acrylic resin can be used as a raw material for a two-component resin composition set. The resin composition set according to one embodiment is a resin composition set including a first liquid containing an oxidizing agent and a second liquid containing a reducing agent (two-component resin composition set). At least one of the first liquid and the second liquid contains the above acrylic resin. When the first liquid and the second liquid are mixed, the oxidizing agent and the reducing agent react to generate free radicals, and curing of the mixture containing the acrylic resin (including the cross-linking reaction) proceeds. According to the resin composition set of the present embodiment, when the first liquid and the second liquid are mixed, a cured product of the mixture containing the first liquid and the second liquid is immediately obtained. That is, the resin composition set according to the present embodiment can cure a mixture containing an acrylic resin at a high speed.

In order to obtain excellent affinity when the first liquid and the second liquid are mixed, increase the mixing degree, and reduce variations in characteristics, in one embodiment, the first liquid contains the acrylic resin and the oxidizing agent, and the second liquid contains the acrylic resin and the reducing agent.

In another embodiment, the first liquid contains an acrylic resin and an oxidizing agent, and the second liquid contains a reducing agent (does not contain an acrylic resin). In another embodiment, the first liquid contains an oxidizing agent (does not contain an acrylic resin), and the second liquid contains an acrylic resin and a reducing agent.

In order to obtain a sufficient amount of heat storage when the heat storage material is formed, the content of the acrylic resin is preferably 30 parts by mass or more, more preferably 40 parts by mass or more, still more preferably 60 parts by mass or more, and particularly preferably 80 parts by mass or more with respect to 100 parts by mass of a total amount of the first liquid and the second liquid. The content of the acrylic resin may be 99.5 parts by mass or less, 99.0 parts by mass or less or 98.0 parts by mass or less with respect to 100 parts by mass of a total amount of the first liquid and the second liquid.

The oxidizing agent contained in the first liquid has a role of a polymerization initiator (radical polymerization initiator). The oxidizing agent may be, for example, an organic peroxide or an azo compound. The organic peroxide may be, for example, a hydroperoxide, peroxydicarbonate, peroxy ester, peroxy acetal, dialkyl peroxide, or diacyl peroxide. The azo compound may be AIBN (2,2'-azobisisobutyronitrile), V-65 (azobisisobutyvaleronitrile), or the like. Oxidizing agents may be used alone or two or more thereof may be used in combination.

Examples of hydroperoxides include diisopropylbenzenehydroperoxide and cumene hydroperoxide.

Examples of peroxydicarbonates include di-n-propyl peroxy dicarbonate, diisopropyl peroxydicarbonate, bis(4-t-butylcyclohexyl)peroxydicarbonate, di-2-ethoxymethoxy peroxydicarbonate, di(2-ethylhexyl peroxy)dicarbonate, dimethoxybutyl peroxydicarbonate, and di(3-methyl-3methoxybutylperoxy)dicarbonate.

Examples of peroxy esters include cumyl peroxyneodecanoate, 1,1,3,3-tetramethylbutylperoxyneodecanoate, 1-cyclohexyl-1-methylethylperoxyneodecanoate, t-hexyl peroxyneodecanoate, t-butyl peroxypivalate, 1,1,3,3-tetramethylbutylperoxy-2-ethylhexanonate, 2,5-dimethyl-2,5-di(2-ethylhexanoylperoxy)hexane, 1-cyclohexyl-1-methylethylperoxy-2-ethylhexanonate, t-hexyl peroxy-2-ethyl hexanonate, t-butyl peroxy-2-ethyl hexanonate, t-butylperoxyisobutyrate, 1,1-bis(t-butylperoxy)cyclohexane, t-butylperoxy-3,5,5-trimethylhexanonate, t-butylperoxylaurate, 2,5-dimethyl-2,5-di(m-toluoyl peroxy)hexane, t-hexyl peroxybenzoate, and t-butyl peroxy acetate.

Examples of peroxy acetals include 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclododecane, and 2,2-bis(t-butylperoxy)decane.

Examples of dialkyl peroxides include α,α'-bis(t-butylperoxy)diisopropylbenzene, dicumyl peroxide, 2,5-dimethyl-2,5-di(t-butylperoxy)hexane, and t-butylcumyl peroxide.

Examples of diacyl peroxides include isobutyl peroxide, 2,4-dichlorobenzoyl peroxide, 3,5,5-trimethylhexanoyl peroxide, octanoyl peroxide, lauroyl peroxide, stearoyl peroxide, succinic peroxide, benzoyl peroxide, and benzoyl peroxide.

In consideration of storage stability, the oxidizing agent is preferably peroxide, more preferably hydroperoxide, and still more preferably cumene hydroperoxide.

The content of the oxidizing agent in the first liquid may be 0.5 parts by mass or more, 1 part by mass or more, or 2 parts by mass or more, and may be 20 parts by mass or less, 10 parts by mass or less or 5 parts by mass or less with respect to 100 parts by mass of the first liquid. The content of the oxidizing agent in the first liquid may be 0.1 parts by mass or more, 0.5 parts by mass or more or 1 part by mass or more and may be 10 parts by mass or less, 5 parts by mass or less or 3 parts by mass or less with respect to 100 parts by mass of a total amount of the first liquid and the second liquid.

Examples of reducing agents contained in the second liquid include tertiary amines, thiourea derivatives, and transition metal salts. Examples of tertiary amines include triethylamine, tripropylamine, tributylamine, and N,N-dimethylparatoluidine. Examples of thiourea derivatives include 2-mercaptobenzimidazole, methylthiourea, dibutylthiourea, tetramethylthiourea, and ethylenethiourea. Examples of transition metal salts include cobalt naphthenate, copper naphthenate, and vanadyl acetylacetone. Reducing agents may be used alone or two or more thereof may be used in combination.

In order to obtain an excellent curing speed, the reducing agent is preferably thiourea derivatives or transition metal salts. The thiourea derivatives may be, for example, ethylene thiourea. For the same reason, the transition metal salts are preferably vanadyl acetylacetone.

The content of the reducing agent in the second liquid may be 0.1 parts by mass or more, 0.3 parts by mass or more, or 0.5 parts by mass or more, and may be 10 parts by mass or less, 5 parts by mass or less, or 3 parts by mass or less with respect to 100 parts by mass of the second liquid. The content of the reducing agent in the second liquid may be 0.05 parts by mass or more, 0.1 parts by mass or more, or 0.3 parts by mass or more and may be 5 parts by mass or less, 3 parts by mass or less, or 1 part by mass or less with respect to 100 parts by mass of a total amount of the first liquid and the second liquid.

The resin composition set may contain components other than the acrylic resin, the oxidizing agent and the reducing agent. Other components may be contained in one or both of the first liquid and the second liquid, and may be contained in a third liquid different from the first liquid and the second liquid.

Other components may be a monomer represented by the following Formula (4) (monomer X).

[Chem. 12]

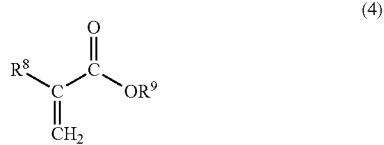

(4)

in the formula, $R^8$ represents a hydrogen atom or a methyl group, and $R^9$ represents an alkyl group having 12 to 30 carbon atoms.

The alkyl group represented by $R^9$ may be linear or branched. The number of carbon atoms of the alkyl group represented by $R^9$ is preferably 12 to 28, more preferably 12 to 24, still more preferably 12 to 22, particularly preferably 12 to 18, and most preferably 12 to 14.

In other words, the monomer X is an alkyl (meth)acrylate having a linear or branched alkyl group having 12 to 30 carbon atoms at the end of the ester group. Examples of monomer X include dodecyl (meth)acrylate (lauryl (meth) acrylate), tetradecyl (meth)acrylate, hexadecyl (meth)acrylate (cetyl (meth)acrylate), octadecyl (meth)acrylate (stearyl (meth)acrylate), docosyl (meth)acrylate (behenyl (meth) acrylate), tetracosyl (meth)acrylate, hexacosyl (meth)acrylate, and octacosyl (meth)acrylate. These monomers X may be used alone or two or more thereof may be used in combination.

In order to obtain a sufficient amount of heat storage when the heat storage material is formed, the content of the monomer X is preferably 20 parts by mass or more, more preferably 30 parts by mass or more, and still more preferably 40 parts by mass or more, and may be, for example, 60 parts by mass or less, with respect to 100 parts by mass of a total amount of the first liquid and the second liquid.

Examples of other components include a curing accelerator, a hydrocarbon compound, an antioxidant, a coloring agent, fatty acids, fatty acid esters, aliphatic ketones, aliphatic aldehydes, aliphatic alcohols, aliphatic ethers, a filler, a crystal nucleating agent, a heat stabilizer, a thermal conductive material, a plasticizer, a foaming agent, a flame retardant, and a damping agent. Such other components may be used alone or two or more thereof may be used in combination. Other components may be contained in one or both of the first liquid and the second liquid.

The first liquid and/or the second liquid are preferably a liquid at room temperature (25° C.) and may be a liquid in a range of 20° C. or higher. In order to obtain excellent fluidity and handling properties, the viscosity of the first liquid and/or the second liquid at 60° C. is preferably 100 Pas or less, more preferably 50 Pas or less, still more preferably 20 Pas or less, and particularly preferably 10 Pas or less. For the same reason, the viscosity of the first liquid and/or the second liquid is, at the melting point of the acrylic resin +20° C., preferably 100 Pas or less, more preferably 50 Pas or less, still more preferably 20 Pas or less, and particularly preferably 10 Pas or less. The viscosity of the first liquid and/or the second liquid at 60° C. or the viscosity at the melting point of the acrylic resin +20° C. may be, for example, 0.5 Pas or more.

The viscosity of the first liquid and/or the second liquid means a value measured based on JIS Z 8803, and specifically, means a value measured by an E type viscometer (commercially available from Toki Sangyo Co., Ltd., PE-80L). Here, the viscometer can be calibrated based on JIS Z 8809-JS14000. In addition, the melting point of the acrylic resin means a value measured by the method described in examples.

In the resin composition set described above, the mixture (resin composition) can be cured by mixing the first liquid and the second liquid. The cured product of the mixture is suitably used as a heat storage material. That is, the mixture containing the first liquid and the second liquid is suitable as a resin composition for a heat storage material. The heat storage material according to one embodiment contains a cured product of the mixture containing the first liquid and the second liquid described above. In this heat storage material, since a cured product of the acrylic resin functions as a component having a heat storage property, in one embodiment, for example, the heat storage material does not include a heat storage capsule containing a latent heat storage material used in the conventional heat storage material, and in this case also, an excellent amount of heat storage is obtained.

The heat storage material (a cured product of the mixture containing the first liquid and the second liquid) can be used in various fields. The heat storage material is used for, for example, air conditioning instruments (improving efficiency of air conditioning instruments) in automobiles, buildings, public facilities, underground shopping centers, and the like, pipes (heat storage of pipes) in factories and the like, automobile engines (heat retention around the engines), electronic components (prevention of temperature rise of electronic components), and fibers for underwear.

In each of these applications, the heat storage material is arranged in thermal contact with a heat source that generates heat in each application, and thus can store heat of the heat source. That is, one embodiment of the present invention is an article including a heat source and a heat storage material (a cured product of the mixture containing the first liquid and the second liquid) that is provided so that it is in thermal contact with the heat source.

FIG. 1 is a schematic cross-sectional view showing one embodiment of an article including a heat storage material. As shown in FIG. 1, an article 1 includes a heat source 2 and a heat storage material 3 that is provided so that it is in thermal contact with the heat source 2. The heat storage material 3 may be arranged in thermal contact with at least a part of the heat source 2, and as shown in FIG. 1, or may be arranged so that a part of the heat source 2 is exposed or the entire surface of the heat source 2 is covered. If the heat storage material 3 is in thermal contact with the heat source 2, the heat source 2 and the heat storage material 3 may be in direct contact with each other, and another member (for example, a member having thermal conductivity) may be arranged between the heat source 2 and the heat storage material 3.

For example, when the heat storage material 3 is used together with an air conditioning instrument (or a part thereof), a pipe, or an automobile engine as the heat source 2, the heat storage material 3 is in thermal contact with these heat sources 2, the heat storage material 3 stores heat generated from the heat source 2, and the heat source 2 is easily maintained at a certain temperature or higher (heat is retained). When the heat storage material 3 is used as fibers for underwear, since the heat storage material 3 stores heat generated from the human body as the heat source 2, warmth can be felt for a long time.

For example, if the heat storage material 3 is used together with the electronic component as the heat source 2, when it is arranged in thermal contact with the electronic component, it is possible to store heat generated in the electronic component. In this case, for example, when the heat storage material is arranged in additional thermal contact with the heat dissipation member, heat stored in the heat storage material can be gradually released, and it is possible to prevent heat generated in the electronic component from being released rapidly to the outside (and the vicinity of the electronic component from becoming locally hot).

The heat storage material 3 may be arranged in the heat source 2 after a cured product of the mixture containing the first liquid and the second liquid described above is formed in a sheet form (film form). The sheet-like cured product is obtained by mixing the first liquid and the second liquid of the resin composition set and performing molding. That is, in one embodiment, a method of producing the heat storage material 3 includes a step of mixing the first liquid and the second liquid of the resin composition set and performing molding into a sheet form (molding step). Molding in the molding step may be injection molding, compression molding or transfer molding. In this case, the heat storage material 3 does not require a casing, and the heat storage material 3 alone can be adhered to an attachment target, wound therearound, and attached in various states.

In another embodiment, a cured product of the mixture containing the first liquid and the second liquid described above (simply referred to as a "cured product") can also be used for applications other than the heat storage material. The cured product is suitably used to form, for example, a water-repellent material, an anti-frost material, a refractive index adjusting material, a lubricant, an adsorbent, a thermosetting stress relaxation material or a low dielectric material. The water-repellent material, the anti-frost material, the refractive index adjusting material, the lubricant, the adsorbent, the thermosetting stress relaxation material and the low dielectric material each may contain, for example, the above cured product.

EXAMPLES

While the present invention will be described below in more detail with reference to examples, the present invention is not limited to the following examples.

[Synthesis of Acrylic Resin]

Acrylic resins A to E used in Examples 1 to 7 were synthesized by a known solution polymerization method as follows.

(Synthesis Example of Acrylic Resin A)

A 500 mL flask composed of a stirrer, a thermometer, a nitrogen gas introduction pipe, a discharge pipe and a heating jacket was used as a reaction container, 80 g of tetradecyl acrylate, 10 g of butyl acrylate, and 10 g of 2-hydroxyethyl acrylate as monomers, and 81.8 g of 2-propanol as a solvent were mixed, and the mixture was added to the reaction container, and stirred at room temperature (25° C.) and at a stirring rotational speed of 250 times/min for 1 hour, and nitrogen was flowed at 100 mL/min.

Then, the temperature was raised to 70° C. over 30 minutes, and after temperature rise was completed, a solution obtained by dissolving 0.28 g of azobisisobutyronitrile in 2 mL of methyl ethyl ketone was added to the reaction container, and the reaction was started. Then, the mixture was stirred in the reaction container at a temperature of 70° C. and reacted for 5 hours. Then, a solution obtained by dissolving 0.05 g of azobisisobutyronitrile in 2 mL of methyl ethyl ketone was added to the reaction container, the temperature was raised to 90° C. for 15 minutes, and the mixture was additionally reacted for 2 hours. Then, the solvent was removed and dried to obtain an acrylic resin A intermediate. Next, a 300 mL eggplant flask was used as a reaction container, and 100 g of the acrylic resin A intermediate, 1.5 g of 2-isocyanatoethyl methacrylate, and 0.005 g of dibutyltin dilaurate were mixed, and the mixture was stirred at 75° C. for 1 hour at a stirring rotational speed of 400 rpm to obtain an acrylic resin A. The weight average molecular weight (Mw) of the acrylic resin A was 26,000.

Acrylic resins B to E were synthesized in the same method as in the synthesis example of the acrylic resin A except that monomer components were changed to monomer components shown in Table 1. Table 1 also shows the weight average molecular weight (Mw) and the melting point of the obtained acrylic resins.

The melting point of the acrylic resin was measured as follows.

Using a differential scanning calorimeter (model number DSC8500, commercially available from PerkinElmer Co., Ltd.), the temperature was raised to 100° C. at 20° C./min, and the acrylic resin was maintained at 100° C. for 3 minutes and then cooled to −30° C. at a rate of 10° C./min, and then maintained at −30° C. for 3 minutes. Then, the temperature raised again to 100° C. at a rate of 10° C./min, and thus thermal behavior of the acrylic resin was measured, and the melting peak was calculated as a melting point of the acrylic resin.

TABLE 1

| | | Acrylic resin | | | | |
|---|---|---|---|---|---|---|
| | | A | B | C | D | E |
| Monomer component (parts by mass) | Lauryl acrylate | — | — | 90 | — | — |
| | Tetradecyl acrylate | 80 | 80 | — | — | — |
| | Cetyl acrylate | — | — | — | 90 | — |
| | Stearyl acrylate | — | — | — | — | 90 |
| | 2-Hydroxyethyl acrylate | 10 | 10 | 10 | 10 | 10 |
| | Butyl acrylate | 10 | 10 | — | — | — |
| | 2-Isocyanatoethyl methacrylate | 1.5 | 2.5 | 1.5 | 1.5 | 1.5 |
| Weight average molecular weight (Mw) | | 26000 | 26000 | 23000 | 26000 | 27000 |
| Melting point (° C.) | | 8.6 | 8.2 | −6.8 | 31.2 | 44.0 |

Here, lauryl acrylate (commercially available from Osaka Organic Chemical Industry Ltd.), tetradecyl acrylate (commercially available from Tokyo Chemical Industry Co., Ltd.), butyl acrylate (commercially available from Wako Pure Chemical Corporation), cetyl acrylate and stearyl acrylate (commercially available from NOF Corporation), 2-hydroxyethyl acrylate (commercially available from Nippon Shokubai Co., Ltd.), and 2-isocyanatoethyl methacrylate (commercially available from Showa Denko K.K.) were used.

[Production of Heat Storage Material]

Example 1

50 g of the acrylic resin A, 50 g of tetradecyl acrylate, and 3.5 g of cumene hydroxyperoxide were mixed to obtain a first liquid. In addition, 50 g of the acrylic resin A, 50 g of tetradecyl acrylate, and 1.0 g of vanadyl acetylacetonate were mixed to obtain a second liquid. The viscosity of the first liquid at 60° C. was measured using an E type viscosmeter (PE-80L commercially available from Toki Sangyo Co., Ltd.) based on JIS Z 8803. The results are shown in Table 2.

Next, a 10 cm×10 cm×1 mm mold (SUS plate) was installed as a spacer on a polyethylene terephthalate (PET) film, and the first liquid and the second liquid were filled thereinto while mixing using a mixing nozzle (commercially available from Tomita Engineering Co., Ltd.), and covering with another PET film was performed and curing was performed for 24 hours. After curing, the PET film and the mold were removed to obtain a sheet-like heat storage material having a thickness of 1 mm.

Examples 2 to 7

The viscosity of the first liquid was measured and the heat storage material was produced in the same method as in Example 1 except that the compositions of the first liquid and the second liquid were changed as shown in Table 2. The results are shown in Table 2.

[Evaluation of Melting Point and Amount of Heat Storage]

Each of the heat storage materials produced in the examples was measured using a differential scanning calorimeter (model number DSC8500 commercially available from PerkinElmer Co., Ltd.), and a melting point and an amount of heat storage were calculated. Specifically, the temperature raised to 100° C. at 20° C./min, the heat storage material was maintained at 100° C. for 3 minutes, and then cooled to −30° C. at a rate of 10° C./min, and then maintained at −30° C. for 3 minutes. Then, the temperature raised again to 100° C. at a rate of 10° C./min, and thus thermal behavior was measured. The melting peak was used as a melting point of the heat storage material, and the area was used as an amount of heat storage. The results are shown in Table 2. Here, when the amount of heat storage was 30 J/g or more, it can be said that the amount of heat storage was excellent.

[Evaluation of Liquid Leakage and Volatility]

The change in weight before and after each of the heat storage materials produced in the examples was left for 1,000 hours under an atmospheric atmosphere at a temperature of 80° C. was measured, and the weight loss ratio (%) was measured. The results are shown in Table 2.

[Measurement of Gelation Time]

1 g of each of the first liquid and the second liquid produced in the examples was filled into an aluminum cup with a diameter of 4 cm, and the time until gelation was performed while stirring the aluminum cup with a bamboo skewer was measured. The results are shown in Table 2.

TABLE 2

| | | Example | | | | | | |
|---|---|---|---|---|---|---|---|---|
| | | 1 | 2 | 3 | 4 | 5 | 6 | 7 |
| Composition of first liquid (parts by mass) | Acrylic resin A | 50 | 100 | 100 | — | — | — | — |
| | Acrylic resin B | — | — | — | 100 | — | — | — |
| | Acrylic resin C | — | — | — | — | 100 | — | — |
| | Acrylic resin D | — | — | — | — | — | 100 | — |
| | Acrylic resin E | — | — | — | — | — | — | 100 |
| | TDA | 50 | — | — | — | — | — | — |
| | CHP | 3.5 | 3.5 | 3.5 | 3.5 | 3.5 | 3.5 | 3.5 |
| Composition of second liquid (parts by mass) | Acrylic resin A | 50 | 100 | 100 | — | — | — | — |
| | Acrylic resin B | — | — | — | 100 | — | — | — |
| | Acrylic resin C | — | — | — | — | 100 | — | — |
| | Acrylic resin D | — | — | — | — | — | 100 | — |
| | Acrylic resin E | — | — | — | — | — | — | 100 |
| | TDA | 50 | — | — | — | — | — | — |
| | VAA | 1.0 | 1.0 | — | 1.0 | 1.0 | 1.0 | 1.0 |
| | Ethylene thiourea | — | — | 1.0 | — | — | — | — |
| Viscosity of first liquid (Pa · s) | | 1.0 | 3.8 | 3.8 | 3.5 | 3.8 | 3.7 | 3.8 |
| Melting point (° C.) | | 14.4 | 8.6 | 8.8 | 8.2 | −6.8 | 31.2 | 44.0 |
| Amount of heat storage (J/g) | | 55.6 | 41.0 | 40.2 | 39.8 | 35.2 | 50.2 | 72.2 |
| Liquid leakage and volatility (%) | | <1 | <1 | <1 | <1 | <1 | <1 | <1 |
| Gelation time (sec) | | 30 | 120 | 600 | 20 | 120 | 120 | 120 |

In Table 2, TDA indicates tetradecyl acrylate (commercially available from Tokyo Chemical Industry Co., Ltd.), CHP indicates cumene hydroxyperoxide (commercially available from Wako Pure Chemical Corporation), and VAA indicates vanadyl acetylacetonate (commercially available from Wako Pure Chemical Corporation). Ethylene thiourea (commercially available from Wako Pure Chemical Corporation) was used.

The heat storage materials of the examples can be obtained by rapidly curing the first liquid and the second liquid, and has an excellent amount of heat storage, and also can minimize liquid leakage and volatilization. In addition, since the heat storage materials of the examples are obtained by mixing and curing the first liquid and second liquid in a liquid state, they are advantageous because they can also be applied to members having complicated shapes.

The invention claimed is:

1. A heat storage material-lining a cured product of a mixture containing a first liquid and a second liquid in a resin composition set, wherein the resin composition set comprises:

the first liquid containing an oxidizing agent and the second liquid containing a reducing agent, wherein at least one of the first liquid and the second liquid contains an acrylic resin, the acrylic resin contains a first structural unit represented by the following Formula (1) and a second structural unit represented by the following Formula (2):

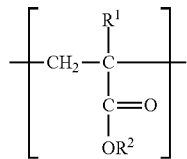
(1)

[in the formula, $R^1$ represents a hydrogen atom or a methyl group and $R^2$ represents an alkyl group having 12 to 30 carbon atoms]

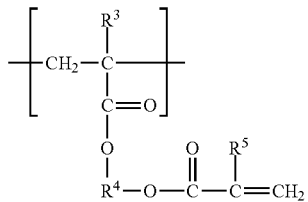
(2)

[in the formula, $R^3$ and $R^5$ each independently represent a hydrogen atom or a methyl group, and $R^4$ represents a group represented by the following Formulae (5) or (8)]

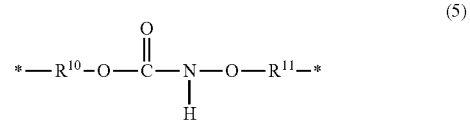
(5)

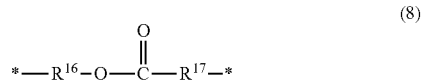
(8)

[in the formula, $R^{10}$, $R^{11}$, $R^{16}$ and $R^{17}$ each independently represent a divalent hydrocarbon group, and * represents a bond].

2. The heat storage material according to claim 1, wherein the alkyl group represented by $R^2$ is a tetradecyl group, a hexadecyl group, an octadecyl group, a docosyl group, a tetracosyl group, a hexacosyl group, or an octacosyl group.

3. The heat storage material according to claim 1, wherein a content of the first structural unit is 70 parts by mass or more and 98 parts by mass or less, with respect to 100 parts by mass of all structural units constituting the acrylic resin.

4. The heat storage material according to claim 3, wherein a content of the second structural unit is 2 parts by mass or more and 20 parts by mass or less, with respect to 100 parts by mass of all structural units constituting the acrylic resin.

5. An article, comprising:

a heat source; and the heat storage material according to claim 1 that is provided so that the heat storage material is in thermal contact with the heat source.

* * * * *

UNITED STATES PATENT AND TRADEMARK OFFICE
CERTIFICATE OF CORRECTION

| | |
|---|---|
| PATENT NO. | : 11,965,048 B2 |
| APPLICATION NO. | : 17/261877 |
| DATED | : April 23, 2024 |
| INVENTOR(S) | : Naoki Furukawa et al. |

It is certified that error appears in the above-identified patent and that said Letters Patent is hereby corrected as shown below:

In the Claims

Column 19, Line 8-Column 20, Lines 1-18, should read:
1. A heat storage material containing a cured product of a mixture containing a first liquid and a second liquid in a resin composition set, wherein the resin composition set comprises:
 the first liquid containing an oxidizing agent and the second liquid containing a reducing agent,
 wherein at least one of the first liquid and the second liquid contains an acrylic resin,
 the acrylic resin contains a first structural unit represented by the following Formula (1) and a second structural unit represented by the following Formula (2):

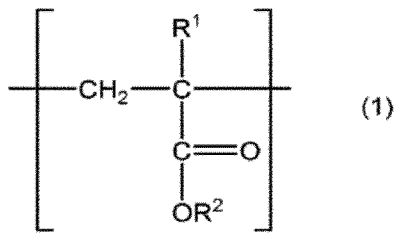

[in the formula, $R^1$ represents a hydrogen atom or a methyl group and $R^2$ represents an alkyl group having 12 to 30 carbon atoms]

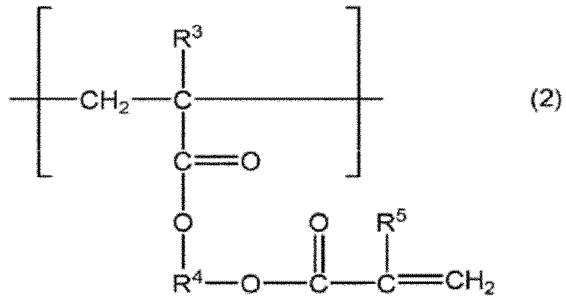

[in the formula, $R^3$ and $R^5$ each independently represent a hydrogen atom or a methyl group, and $R^4$ represents a group represented by the following Formulae (5) or (8)]

Signed and Sealed this
Twenty-sixth Day of November, 2024

Katherine Kelly Vidal
*Director of the United States Patent and Trademark Office*

CERTIFICATE OF CORRECTION (continued)

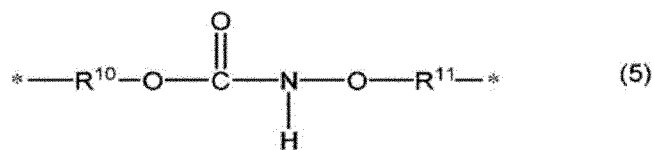 (5)

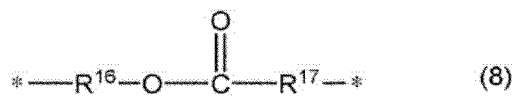 (8)

[in the formula, $R^{10}$, $R^{11}$, $R^{16}$ and $R^{17}$ each independently represent a divalent hydrocarbon group, and * represents a bond].